(12) United States Patent
Bugenhagen et al.

(10) Patent No.: US 10,469,407 B2
(45) Date of Patent: *Nov. 5, 2019

(54) METHOD AND SYSTEM FOR IMPLEMENTING INTENT-BASED SERVICE CONFIGURATION, SERVICE CONFORMANCE, AND SERVICE AUDITING

(71) Applicant: CenturyLink Intellectual Property LLC, Broomfield, CO (US)

(72) Inventors: Michael K. Bugenhagen, Leawood, KS (US); Kevin M. McBride, Lone Tree, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,498

(22) Filed: Feb. 15, 2019

(65) Prior Publication Data
US 2019/0182177 A1    Jun. 13, 2019

Related U.S. Application Data

(63) Continuation-in-part of application No. 15/857,244, filed on Dec. 28, 2017, now Pat. No. 10,250,525, which is a continuation of application No. 14/983,884, filed on Dec. 30, 2015, now Pat. No. 9,882,833.

(Continued)

(51) Int. Cl.
*G06F 15/173*   (2006.01)
*H04L 12/927*   (2013.01)
*H04L 12/923*   (2013.01)

(52) U.S. Cl.
CPC .......... *H04L 47/805* (2013.01); *H04L 47/762* (2013.01)

(58) Field of Classification Search
None
See application file for complete search history.

(56) References Cited

U.S. PATENT DOCUMENTS

| 9,356,883 | B1 * | 5/2016 | Borthakur | ........... H04L 41/5025 |
| 2008/0002677 | A1 * | 1/2008 | Bugenhagen | ........... H04L 12/14 370/356 |

(Continued)

*Primary Examiner* — Mohamed Ibrahim

(57) ABSTRACT

Novel tools and techniques are provided for implementing intent-based service configuration, conformance, and auditing. In various embodiments, a computing system might receive a request for network services from a customer, the request for network services comprising desired characteristics and performance parameters for the requested network services, without information regarding specific hardware, hardware type, or network for providing the requested services. The computing system might analyze first metadata regarding resource attributes and characteristics of unassigned network resources to identify network resources among unassigned network resources for providing the requested network services, the first metadata having been striped to entries of the unassigned network resources in resource database(s). Based on the analysis, the computing system might allocate identified network resource(s) for providing the requested network services, and updating a service database by adding or updating an entry in the service database with information indicating that the identified network resource(s) have been allocated.

20 Claims, 11 Drawing Sheets

Related U.S. Application Data

(60) Provisional application No. 62/774,776, filed on Dec. 3, 2018, provisional application No. 62/748,949, filed on Oct. 22, 2018, provisional application No. 62/247,294, filed on Oct. 28, 2015, provisional application No. 62/233,911, filed on Sep. 28, 2015.

(56) References Cited

U.S. PATENT DOCUMENTS

| | | | | |
|---|---|---|---|---|
| 2008/0049639 A1* | 2/2008 | Wiley | H04L 41/18 | 370/252 |
| 2008/0052387 A1* | 2/2008 | Heinz | H04L 41/5025 | 709/223 |
| 2015/0150020 A1* | 5/2015 | Duttagupta | G06F 9/466 | 718/104 |

* cited by examiner

METHOD AND SYSTEM FOR IMPLEMENTING INTENT-BASED SERVICE CONFIGURATION, SERVICE CONFORMANCE, AND SERVICE AUDITING

CROSS-REFERENCES TO RELATED APPLICATIONS

This application claims priority to U.S. Patent Application Ser. No. 62/774,776 (the "'776 Application"), filed Dec. 3, 2018 by Michael K. Bugenhagen et al., entitled, "Method and System for Implementing Intent-Based Service Configuration, Service Conformance, and Service Auditing," and U.S. Patent Application Ser. No. 62/748,949 (the "'949 Application"), filed Oct. 22, 2018 by Michael K. Bugenhagen, entitled, "AI Self Adjusting Equality of Outcome ML Engine for Fairness Routines," the disclosure of each of which is incorporated herein by reference in its entirety for all purposes.

This application is a continuation-in-part application of U.S. patent application Ser. No. 15/857,244 (the "'244 Application") filed Dec. 28, 2017 by Kevin McBride et al., entitled, "Intent-Based Services Orchestration," which is a continuation of U.S. patent application Ser. No. 14/983,884 (the "'884 Application"; now U.S. Pat. No. 9,882,833) filed Dec. 30, 2015 by Kevin McBride et al., entitled, "Intent-Based Services Orchestration," which claims priority to U.S. Patent Application Ser. No. 62/247,294 (the "'294 Application") filed Oct. 28, 2015 by Kevin McBride et al., entitled, "Intent-Based Services Orchestration," and U.S. Patent Application Ser. No. 62/233,911 (the "'911 Application") filed Sep. 28, 2015 by Kevin McBride et al., entitled, "Intent-Based Services Orchestration," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network services orchestration, and, in particular embodiments, to methods, systems, and computer software for implementing intent-based service configuration, service conformance, and service auditing.

BACKGROUND

In typical network resource allocation schemes, a customer might provide a request for network services from a set list of network services, which might include, among other things, information regarding one or more of specific hardware, specific hardware type, specific location, and/or specific network for providing network services, or the like. The customer might select the particular hardware, hardware type, location, and/or network based on stated or estimated performance metrics for these components or generic versions of these components, but might not convey the customer's specific desired performance parameters. The service provider then allocates network resources based on the selected one or more of specific hardware, specific hardware type, specific location, or specific network for providing network services, as indicated in the request.

Such specific requests, however, do not necessarily provide the service provider with the intent or expectations of the customer. Accordingly, the service provider will likely make network resource reallocation decisions based on what is best for the network from the perspective of the service provider, but not necessarily what is best for the customer. Importantly, these conventional systems do not utilize metadata in resource inventory databases for implementing intent-based service configuration, service conformance, and/or service auditing.

Hence, there is a need for more robust and scalable solutions for implementing network services orchestration, and, in particular embodiments, to methods, systems, and computer software for implementing intent-based service configuration, service conformance, and service auditing.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
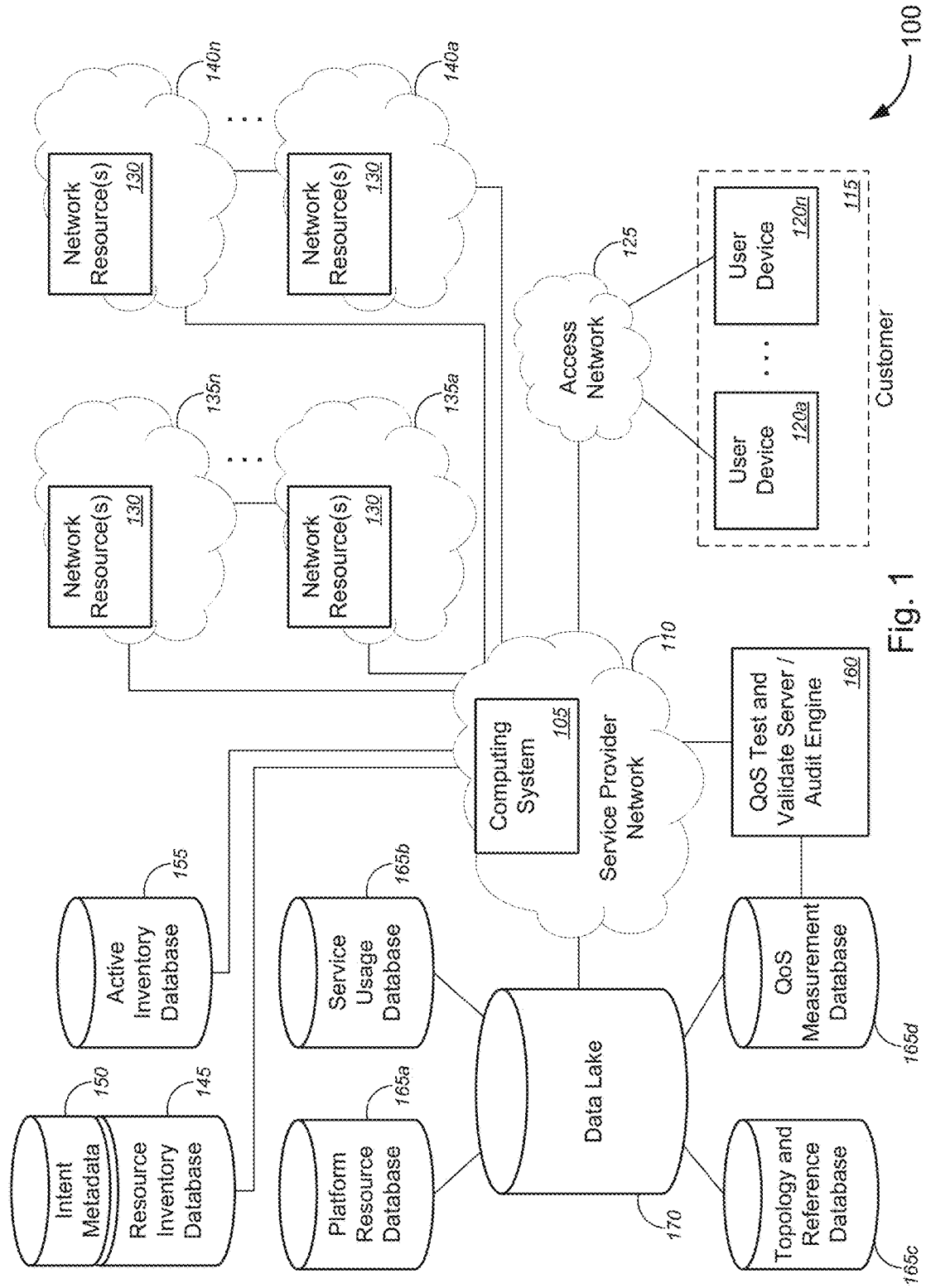
FIG. 1 is a schematic diagram illustrating a system for implementing intent-based service configuration, service conformance, and service auditing, in accordance with various embodiments.

Various embodiments provide tools and techniques for implementing network services orchestration, and, in particular embodiments, to methods, systems, and computer software for implementing intent-based service configuration, service conformance, and service auditing.

In various embodiments, a computing system might receive a request for network services from a customer (e.g., from a user device associated with the customer, or the like). The request for network services might comprise desired characteristics and performance parameters for the requested network services, without information regarding any of specific hardware, specific hardware type, or specific network for providing the requested network services. The computing system might analyze first metadata regarding resource attributes and characteristics of a plurality of unassigned network resources to identify one or more network resources among the plurality of unassigned network resources for providing the requested network services, the first metadata having been striped to entries of the plurality of unassigned network resources in a resource database (e.g., a resource inventory database, or the like). Based on the analysis, the computing system might allocate at least one identified network resource among the identified one or more network resources for providing the requested network services.

The computing system might update a service database by adding or updating an entry in the service database (e.g., resource inventory database or an intent metadata database, or the like) with information indicating that the at least one identified network resource have been allocated for providing the requested network services, and might stripe the entry with second metadata (in some cases, in resource inventory database, intent metadata database, or an active inventory database, or the like) indicative of the desired characteristics and performance parameters as comprised in the request for network services.

According to some embodiments, the desired performance parameters might include, without limitation, at least one of a maximum latency, a maximum jitter, a maximum packet loss, or a maximum number of hops, and/or the like. In some embodiments, the desired characteristics might include, but are not limited to, at least one of requirement for network equipment to be geophysically proximate to the customer, requirement for network equipment to be located within a geophysical location, requirement to avoid routing network traffic through a geophysical location, requirement to route network traffic through a geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multi-goals indicated by the customer, and/or the like.

Merely by way of example, in some cases, an audit engine might determine whether each of the identified one or more network resources conforms with the desired characteristics and performance parameters via algorithm-based field extensions to its inventory and active inventory databases, or the like. The audit engine may perform pre-filtering resource selection functions and/or might check compliance of provisioned services. In some instances, determining whether each of the identified one or more network resources conforms with the desired characteristics and performance parameters might comprise determining, with the audit engine, whether each of the identified one or more network resources conforms with the desired characteristics and performance parameters on a periodic basis or in response to a request to perform an audit. Alternatively, determining whether each of the identified one or more network resources conforms with the desired characteristics and performance parameters might comprise determining, with the audit engine, whether each of the identified one or more network resources conforms with the desired characteristics and performance parameters, by: measuring one or more network performance metrics of each of the identified one or more network resources; comparing, with the audit engine, the measured one or more network performance metrics of each of the identified one or more network resources with the desired performance parameters; determining characteristics of each of the identified one or more network resources; and comparing, with the audit engine, the determined characteristics of each of the identified one or more network resources with the desired characteristics. Based on a determination that at least one identified network resource among the identified one or more network resources fails to conform with the desired performance parameters within first predetermined thresholds or based on a determination that the determined characteristics of the at least one identified network resource fails to conform with the desired characteristics within second predetermined thresholds, the computing system might perform one of: reconfiguring the at least one identified network resource to provide the desired characteristics and performance parameters; or reallocating at least one other identified network resources among the identified one or more network resources for providing the requested network services.

In some aspects, each intent might be a goal for the service. These are not policy related. Intents might typically be performance related, or service component quantum oriented, which might mean delay, jitter, packet loss (performance), or service component (asset or path) types, geography, color, attribute, etc. might be considered. This means that the state engines in the service conformance (which might be on a control plane) must monitor and/or store those in local profiles for the bearer and/or service plane in order to make intent-based assignment decisions. These will require closed loop implementation, and the system might implement auditing to ensure that the state is tracked appropriately and that the network resources that are used for fulfilling requested network resources.

Importantly, the various systems utilize metadata in resource inventory databases (e.g., in resource inventory database, intent metadata database, or an active inventory database, or the like) for implementing intent-based service configuration, service conformance, and/or service auditing.

These and other functions of the system and method are described in greater detail above with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network configuration technology, network resource allocation technology, and/or the like. In other aspects, certain embodiments, can improve the functioning of a computer or network system itself (e.g., computing devices or systems that form parts of the network, computing devices or systems, network elements or the like for performing the functionalities described below, etc.), for example, by receiving, with a computing system over a network, a request for network services from a customer, the request for network services comprising desired characteristics and performance parameters for the requested network services, without information regarding any of specific hardware, specific hardware type, or specific network for providing the requested network services; analyzing, with the computing system, first metadata regarding resource attributes and characteristics of a plurality of unassigned network resources to identify one or more network resources among the plurality of unassigned network resources for providing the requested network services, the first metadata having been striped to entries of the plurality of unassigned network resources in a resource database; based on the analysis, allocating, with the computing system, at least one identified network resource among the identified one or more network resources for providing the requested network services; updating, with the computing system, a service database by adding or updating an entry in the service database with information indicating that the at least one identified network resource have been allocated for providing the requested network services; striping, with the computing system, the entry with second metadata indicative of the desired characteristics and performance parameters as comprised in the request for network services; determining, with an audit engine, whether each of the identified one or more network resources conforms with the desired characteristics and performance parameters; and based on a determination that at least one identified network resource among the identified one or more network resources fails to conform with the desired performance parameters within first predetermined thresholds or based on a determination that the determined characteristics of the at least one identified network resource fails to conform with the desired characteristics within second predetermined thresholds, performing one of: reconfiguring, with the computing system, the at least one identified network resource to provide the desired characteristics and performance parameters; or reallocating, with the computing system, at least one other identified network resources among the identified one or more network resources for providing the requested network services; and/or the like.

In particular, to the extent any abstract concepts are present in the various embodiments, those concepts can be implemented as described herein by devices, software, systems, and methods that involve specific novel functionality (e.g., steps or operations), such as, utilizing metadata in resource inventory databases (e.g., in resource inventory database, intent metadata database, or an active inventory database, or the like) for implementing intent-based service configuration, service conformance, and/or service auditing, and/or the like, to name a few examples, that extend beyond mere conventional computer processing operations. These functionalities can produce tangible results outside of the implementing computer system, including, merely by way of example, ability to improve network functions, network resource allocation and utilization, and/or the like, in various embodiments based on the intent-driven requests that are tagged as metadata or the like in resource databases for network resources used to fulfill network service requests by customers, which may be observed or measured by customers and/or service providers.

In an aspect, a method might comprise receiving, with a computing system over a network, a request for network services from a customer, the request for network services comprising desired characteristics and performance parameters for the requested network services, without information regarding any of specific hardware, specific hardware type, or specific network for providing the requested network services; and analyzing, with the computing system, first metadata regarding resource attributes and characteristics of a plurality of unassigned network resources to identify one or more network resources among the plurality of unassigned network resources for providing the requested network services, the first metadata having been striped to entries of the plurality of unassigned network resources in a resource database. The method might further comprise, based on the analysis, allocating, with the computing system, at least one identified network resource among the identified one or more network resources for providing the requested network services; updating, with the computing system, a service database by adding or updating an entry in the service database with information indicating that the at least one identified network resource have been allocated for providing the requested network services; and striping, with the computing system, the entry with second metadata indicative of the desired characteristics and performance parameters as comprised in the request for network services.

In some embodiments, the computing system might comprise one of a server computer over a network, a cloud-based computing system over a network, or a distributed computing system, and/or the like. In some cases, the desired performance parameters might comprise at least one of a maximum latency, a maximum jitter, a maximum packet loss, or a maximum number of hops, and/or the like. In some instances, the desired characteristics might comprise at least one of requirement for network equipment to be geophysically proximate to the customer, requirement for network equipment to be located within a geophysical location, requirement to avoid routing network traffic through a geophysical location, requirement to route network traffic through a geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multi-goals indicated by the customer, and/or the like.

According to some embodiments, the method might further comprise determining, with an audit engine, whether each of the identified one or more network resources conforms with the desired characteristics and performance parameters. In some cases, determining whether each of the identified one or more network resources conforms with the desired characteristics and performance parameters might comprise determining, with the audit engine, whether each of the identified one or more network resources conforms with the desired characteristics and performance parameters on a periodic basis or in response to a request to perform an audit. Alternatively, or additionally, determining whether each of the identified one or more network resources conforms with the desired characteristics and performance parameters might comprise determining, with the audit engine, whether each of the identified one or more network resources conforms with the desired characteristics and performance parameters, by: measuring one or more network performance metrics of each of the identified one or more network resources; comparing, with the audit engine, the measured one or more network performance metrics of each of the identified one or more network resources with the desired performance parameters; determining characteristics of each of the identified one or more network resources; and comparing, with the audit engine, the determined characteristics of each of the identified one or more network resources with the desired characteristics.

In some cases, the method might further comprise, based on a determination that at least one identified network resource among the identified one or more network resources fails to conform with the desired performance parameters within first predetermined thresholds or based on a determination that the determined characteristics of the at least one identified network resource fails to conform with the desired characteristics within second predetermined thresholds, performing one of: reconfiguring, with the computing system, the at least one identified network resource to provide the desired characteristics and performance parameters; or reallocating, with the computing system, at least one other identified network resources among the identified one or more network resources for providing the requested network services.

According to some embodiments, each of the one or more network performance metrics might comprise at least one of quality of service ("QoS") measurement data, platform resource data and metrics, service usage data, topology and reference data, historical network data, or network usage trend data, and/or the like. Alternatively, or additionally, each of the one or more network performance metrics might comprise one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like. In some cases, the first metadata might be analyzed after being received by the computing system in response to one of a pull data distribution instruction, a push data distribution instruction, or a hybrid push-pull data distribution instruction.

In another aspect, an apparatus might comprise at least one process and a non-transitory computer readable medium communicatively coupled to the at least one processor. The non-transitory computer readable medium might have stored thereon computer software comprising a set of instructions that, when executed by the at least one processor, causes the apparatus to: receive, over a network, a request for network services from a customer, the request for network services comprising desired characteristics and performance parameters for the requested network services, without information regarding any of specific hardware, specific hardware type, or specific network for providing the requested network services; analyze first metadata regarding resource attributes and characteristics of a plurality of unassigned network resources to identify one or more network resources among the plurality of unassigned network resources for providing the requested network services, the first metadata having been striped to entries of the plurality of unassigned network resources in a resource database; based on the analysis, allocate at least one identified network resource among the identified one or more network resources for providing the requested network services; update a service database by adding or updating an entry in the service database with information indicating that the at least one identified network resource have been allocated for providing the requested network services; and stripe the entry with second metadata indicative of the desired characteristics and performance parameters as comprised in the request for network services.

According to some embodiments, the apparatus might comprise one of a server computer over a network, a cloud-based computing system over a network, or a distributed computing system, and/or the like. In some cases, the desired performance parameters comprise at least one of a maximum latency, a maximum jitter, a maximum packet loss, or a maximum number of hops, and/or the like. Alternatively, or additionally, the desired characteristics might comprise at least one of requirement for network equipment to be geophysically proximate to the customer, requirement for network equipment to be located within a geophysical location, requirement to avoid routing network traffic through a geophysical location, requirement to route network traffic through a geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multi-goals indicated by the customer, and/or the like.

In some embodiments, the apparatus might further comprise an audit engine, which might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the audit engine to: determine whether each of the identified one or more network resources conforms with the desired characteristics and performance parameters.

In some cases, determining whether each of the identified one or more network resources conforms with the desired characteristics and performance parameters might comprise determining, with the audit engine, whether each of the identified one or more network resources conforms with the desired characteristics and performance parameters on a periodic basis or in response to a request to perform an audit. Alternatively, or additionally, determining whether each of the identified one or more network resources conforms with the desired characteristics and performance parameters might comprise determining whether each of the identified one or more network resources conforms with the desired characteristics and performance parameters, by: measuring one or more network performance metrics of each of the identified one or more network resources; comparing the measured one or more network performance metrics of each of the identified one or more network resources with the desired performance parameters; determining characteristics of each of the identified one or more network resources; and comparing the determined characteristics of each of the identified one or more network resources with the desired characteristics.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, over a network, a request for network services from a customer, the request for network services comprising desired characteristics and performance parameters for the requested network services, without information regarding any of specific hardware, specific hardware type, or specific network for providing the requested network services; analyze first metadata regarding resource attributes and characteristics of a plurality of unassigned network resources to identify one or more network resources among the plurality of unassigned network resources for providing the requested network services, the first metadata having been striped to entries of the plurality of unassigned network resources in a resource database; based on the analysis, allocate at least one identified network resource among the identified one or more network resources for providing the requested network services; update a service database by adding or updating an entry in the service database with information indicating that the at least one identified network resource have been allocated for providing the requested network services; and stripe the entry with second metadata indicative of the desired characteristics and performance parameters as comprised in the request for network services.

In some embodiments, the computing system might comprise one of a server computer over a network, a cloud-based computing system over a network, or a distributed computing system, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing network services orchestration, and, in particular embodiments, to methods, systems, and computer software for implementing intent-based service configuration, service conformance, and service auditing, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing intent-based service configuration, service conformance, and service auditing, in accordance with various embodiments.

In the non-limiting embodiment of FIG. 1, system 100 might comprise a computing system 105 in service provider network 110. The computing system 105 might receive (either via wired or wireless connection) a request for network services from a customer 115, via one or more user devices 120a-120n (collectively, "user devices 120"), via access network 125. The one or more user devices 120 might include, without limitation, at least one of a smart phone, a mobile phone, a tablet computer, a laptop computer, a desktop computer, and/or the like. The request for network services might include desired characteristics and performance parameters for the requested network services, without information regarding any of specific hardware, specific hardware type, or specific network for providing the requested network services. The desired performance parameters, in some embodiments, might include, but is not limited to, at least one of a maximum latency, a maximum jitter, a maximum packet loss, or a maximum number of hops, and/or the like. The desired characteristics, according to some embodiments, might include, without limitation, at least one of requirement for network equipment to be geophysically proximate to the customer, requirement for network equipment to be located within a geophysical location, requirement to avoid routing network traffic through a geophysical location, requirement to route network traffic through a geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multi-goals indicated by the customer, and/or the like.

System 100 might further comprise network resources 130 that may be disposed, and/or communicatively coupled to, networks 135a-135n (collectively, "networks 135" or the like) and/or networks 140a-140n (collectively, "networks 140" or the like). The computing system 105 might analyze first metadata regarding resource attributes and characteristics of a plurality of unassigned network resources to identify one or more network resources 130 among the plurality of unassigned network resources for providing the requested network services, the first metadata having been striped to entries of the plurality of unassigned network resources in a resource database, which might include, without limitation, resource inventory database 145, intent metadata database 150, data lake 170, and/or the like. Based on the analysis, the computing system 105 might allocate at least one identified network resource 130 among the identified one or more network resources 130 for providing the requested network services. The computing system 105 might stripe the entry with second metadata indicative of the desired characteristics and performance parameters as comprised in the request for network services. In some cases, striping the entry with the second metadata might comprise striping the entry in the resource inventory database 145. Alternatively, striping the entry with the second metadata might comprise striping or adding an entry in the intent metadata inventory 150, which might be part of resource inventory database 145 or might be physically separate (or logically partitioned) from the resource inventory database 145, or the like. In some cases, the first metadata might be analyzed after being received by the computing system in response to one of a pull data distribution instruction, a push data distribution instruction, or a hybrid push-pull data distribution instruction, and/or the like.

Once the at least one identified network resource 130 has been allocated or assigned, the computing system 105 might update an active inventory database 155 with such information—in some cases, by adding an entry in the active inventory database 155 with information indicating that the at least one identified network resource 130 has been allocated to provide particular requested network service(s) to customer 115. In some embodiments, the computing system 105 might stripe the added entry in the active inventory database 155 with a copy of the second metadata indicative of the desired characteristics and performance parameters as comprised in the request for network services. In some instances, the resource inventory database 145 might store an equipment record that lists every piece of inventory that is accessible by the computing system 105 (either already allocated for fulfillment of network services to existing customers or available for allocation for fulfillment of new network services to existing or new customers). The active inventory database 155 might store a circuit record listing the active inventory that are being used for fulfilling network services. The data lake 170 might store a customer record that lists the service record of customer, and/or the like.

According to some embodiments, system 100 might further comprise quality of service test and validate server or audit engine 160, which performs measurement and/or collection of network performance metrics for at least one of the one or more network resources 130 and/or the one or more networks 135 and/or 140, and/or which performs auditing to determine whether each of the identified one or more network resources 130 conforms with the desired characteristics and performance parameters. In some cases, network performance metrics might include, without limitation, at least one of quality of service ("QoS") measurement data, platform resource data and metrics, service usage data, topology and reference data, historical network data, or network usage trend data, and/or the like. Alternatively, or additionally, network performance metrics might include, but are not limited to, one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like, which are described in greater detail in the '244 and '884 applications, which have already been incorporated herein by reference in their entirety.

In some embodiments, computing system 105 might allocate one or more network resources 130 from one or more first networks 135*a*-135*n* of a first set of networks 135 and/or from one or more second networks 140*a*-140*n* of a second set of networks 140 for providing the requested network services, based at least in part on the desired performance parameters and/or based at least in part on a determination that the one or more first networks is capable of providing network resources each having the desired performance parameters. According to some embodiments, determination that the one or more first networks is capable of providing network resources each having the desired performance parameters is based on one or more network performance metrics of the one or more first networks at the time that the request for network services from a customer is received.

System 100 might further comprise one or more databases, including, but not limited to, a platform resource database 165*a*, a service usage database 165*b*, a topology and reference database 165*c*, a QoS measurement database 165*d*, and/or the like. The platform resource database 165*a* might collect and store data related or pertaining to platform resource data and metrics, or the like, while the service usage database 165*b* might collect and store data related or pertaining to service usage data or service profile data, and the topology and reference database 165*c* might collect and store data related or pertaining to topology and reference data. The QoS measurement database 165*d* might collect and store QoS data, network performance metrics, and/or results of the QoS test and validate process. Data stored in each of at least one of the platform resource database 165*a*, the service usage database 165*b*, the topology and reference database 165*c*, the QoS measurement database 165*d*, and/or the like, collected in data lake 170, and the collective data or selected data from the data lake 170 are used to perform optimization of network resource allocation (both physical and/or virtual) using the computing system 105 (and, in some cases, using an orchestration optimization engine (e.g., orchestration optimization engine 275 of FIG. 2 of the '244 and '884 applications), or the like).

In some embodiments, determining whether each of the identified one or more network resources conforms with the desired characteristics and performance parameters might comprise determining, with the audit engine 160, whether each of the identified one or more network resources conforms with the desired characteristics and performance parameters on a periodic basis or in response to a request to perform an audit. Alternatively, or additionally, determining whether each of the identified one or more network resources conforms with the desired characteristics and performance parameters might comprise determining, with the audit engine, whether each of the identified one or more network resources conforms with the desired characteristics and performance parameters, by: measuring one or more network performance metrics of each of the identified one or more network resources; comparing, with the audit engine, the measured one or more network performance metrics of each of the identified one or more network resources with the desired performance parameters; determining characteristics of each of the identified one or more network resources; and comparing, with the audit engine, the determined characteristics of each of the identified one or more network resources with the desired characteristics.

Based on a determination that at least one identified network resource among the identified one or more network resources fails to conform with the desired performance parameters within first predetermined thresholds or based on a determination that the determined characteristics of the at least one identified network resource fails to conform with the desired characteristics within second predetermined thresholds, the computing system 105 might perform one of:

reconfiguring the at least one identified network resource to provide the desired characteristics and performance parameters; or reallocating at least one other identified network resources among the identified one or more network resources for providing the requested network services. In some cases, the computing system 105 might perform one of reconfiguring the at least one identified network resource or reallocating at least one other identified network resources, based on a determination that the measured one or more network performance metrics of each of the identified one or more network resources fails to match the desired performance parameters within third predetermined thresholds or based on a determination that the measured one or more network performance metrics of each of the identified one or more network resources fails to match the desired performance parameters within fourth predetermined thresholds.

In some aspects, intent might further include, without limitation, path intent, location intent, performance intent, and/or the like. Path intent, for example, might include a requirement that network traffic must be routed through a first particular geophysical location (e.g., a continent, a country, a region, a state, a province, a city, a town, a mountain range, etc.) and/or a requirement that network traffic must not be routed through a second particular geophysical location, or the like. In such cases, a service commission engine might either add (and/or mark as required) all paths through the first particular geophysical location and all network resources that indicate that they are located in the first particular geophysical location, or remove (and/or mark as excluded) all paths through the second particular geophysical location and all network resources that indicate that they are located in the second particular geophysical location. The service commission engine might use the required or non-excluded paths and network resources to identify which paths and network resources to allocate to fulfill requested network services. In some embodiments, the active inventory might be marked so that any fix or repair action is also restricted and that policy audits might be implemented to ensure no violations of path intent actually occur.

Location intent, for instance, might include a requirement that network resources that are used for fulfilling the requested network services are located in specific geographical locations (which are more specific compared to the general geophysical locations described above). In such cases, the inventory is required to include the metadata for the intent, then the service engine can perform the filtering and selection. Monitoring and/or restricting assets being reassigned may be performed using location intent policy markings (or metadata) on the service.

Performance intent, for example, might include a requirement that the requested services satisfy particular performance parameters or metrics—which might include, without limitation, maximum latency or delay, maximum jitter, maximum packet loss, maximum number of hops, minimum bandwidth, nodal connectivity, minimum amount of compute resources for each allocated network resource, minimum amount of storage resources for each allocated network resource, minimum memory capacity for each allocated network resource, fastest possible path, and/or the like. In such cases, service conformance engine might use the performance metrics (as measured by one or more nodes in the network, which in some cases might include the allocated network resource itself, or the like) between points (or network nodes) for filtering the compliant inventory options, and/or might propose higher levels of service to satisfy the customer and/or cost level alignment, or the like.

Once the assignment portion of the engine has been performed, the active inventory might be marked with the appropriate performance intent policy.

In some embodiments, a SS7 advanced intelligence framework (which might have a local number portability dip to get instructions from an external advanced intelligence function) can be adapted with intent-based orchestration (as described herein) by putting a trigger (e.g., an external data dip, or the like) on the orchestrator between the requesting device or node (where the intent and intent criteria might be sent) and the source of the external function, which might scrape the inventory database to make its instructions and/or solution sets for the fulfillment engine and then stripe metadata, and/or returns that to the normal fulfillment engine.

These and other functions of the system 100 (and its components) are described in greater detail below with respect to FIGS. 2-5.

Figure 2A:
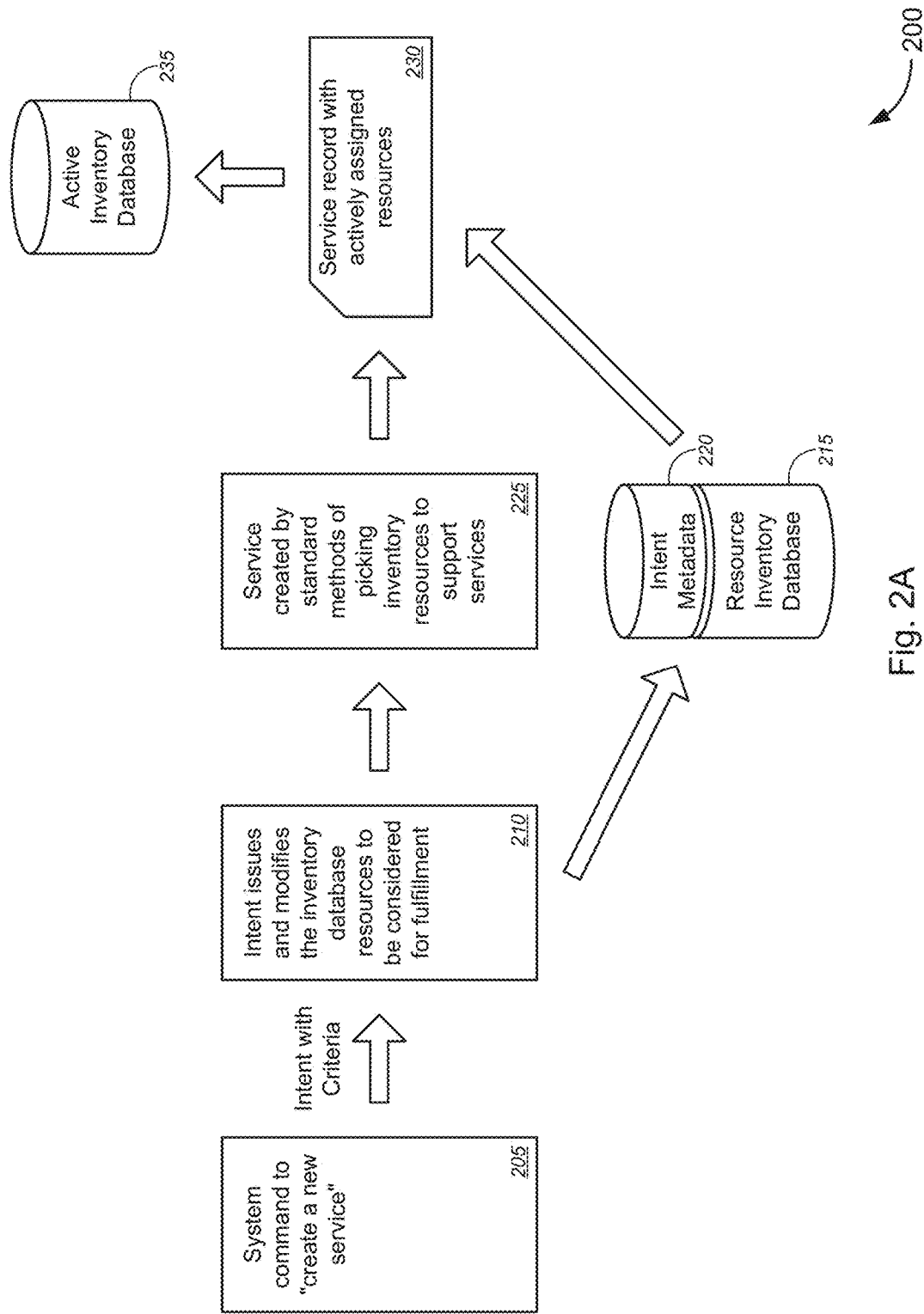
FIGS. 2A and 2B are flow diagrams illustrating various embodiments of a method for implementing intent-based service configuration, service conformance, and service auditing.
Figure 2B:
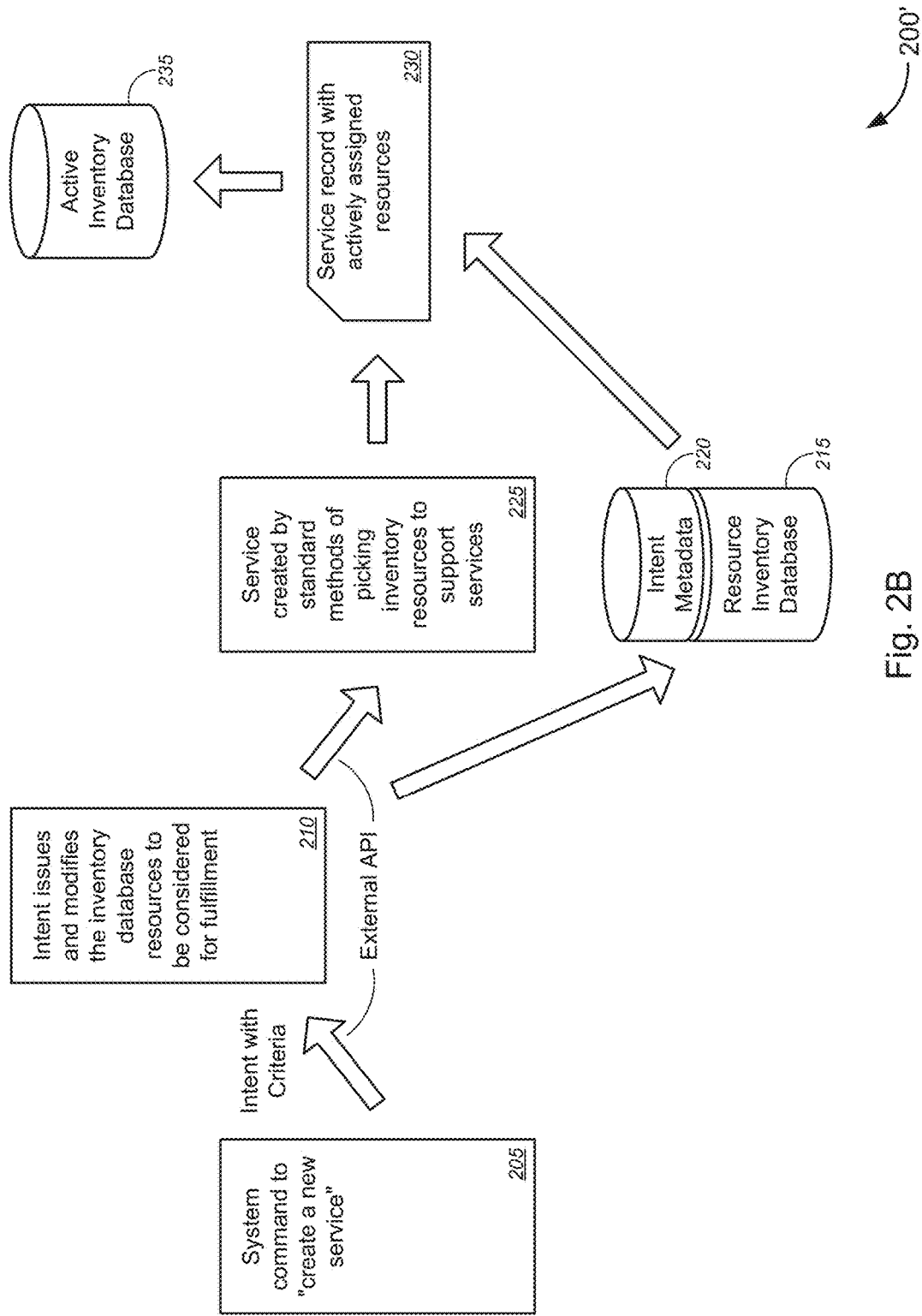

FIGS. 2A and 2B (collectively, "FIG. 2") are flow diagrams illustrating various embodiments 200 and 200' of a method for implementing intent-based service configuration, service conformance, and service auditing.

In the non-limiting embodiment 200 of FIG. 2A, the system (such as system 105 of FIG. 1, or the like) might receive a request from a user to create a new network service and might send or process a system command to create the new network service (block 205), where the system command might include information indicating intent of the user (including, but not limited to, desired characteristics and performance parameters for the requested network service). At block 210, the intent issues and modifies the inventory database resources to be considered for fulfillment. In some cases, the system might add or stripe an entry in resource inventory database 215 and/or intent metadata database 220, the entry being associated with network resources identified by the system for fulfillment of the requested network service.

At block 225, the system might receive the system command (from block 205 and/or block 210) and, in response to receiving the system command, might create the new network service by standard methods of picking or selecting inventory resources to support the requested network service(s). In response, a service record (or metadata) 230 with the actively assigned resources might be sent to (and subsequently stored in) the active inventory database 235. In some embodiments, the added or striped entry in resource inventory database 215 and/or intent metadata database 220 might be sent as a service record (or metadata) 230 to the active inventory database 235. In some cases, the metadata that might be added or striped in the resource inventory database 215, the intent metadata database 220, and/or the active inventory database 235 might indicate reduced pool of resources or priority listing of resources for assignment.

In some embodiments, the system might audit the identified network resources assigned for fulfillment of the requested network service, based at least in part on the added or striped entry in the resource inventory database 215 and/or intent metadata database 220 or based at least in part on the service record 230 stored in active inventory database 235.

The non-limiting embodiment 200' of FIG. 2B might be similar to the embodiment 200 of FIG. 2A, except that external application programming interfaces ("APIs") might be used (between blocks 205 and 210 and between blocks 210 and 225) to send the system command (together with the intent) from block 205 and/or block 210.

Given that intents are essentially automated commands, the fields or information that are passed or sent must be algorithmic-based (meaning that a compute system can use them in a command). The intent criteria (what those algorithm fields might be composed of) might become metadata for the inventory so that the intent may be executed. For example, data jurisdiction might require that the systems used must be located in Kansas (for instance). The resulting intent framework would be that the resource inventory database would be expanded for "state" and that entries for all resources in Kansas would be striped or populated with metadata indicating "Kansas."

Another modification might be made to the service inventory or active inventory where the intent might be stored as part of the circuit record and might be used when performing audits to determine whether the service that is being provisioned on elements that meet its intent criteria.

In contrast to these systems, a conventional system—which might lack the sending of the intent and which might lack block 210 (or might have a blank or reserved block 210)—might have a standard process to create a new "service" that involves having a standard system resource definition, and a standard load balancing method of assigning resources to that service and creating a standard service record. These might utilize an inventory database, and might create service records that are stored in the active inventory as assigned services.

Figure 3:
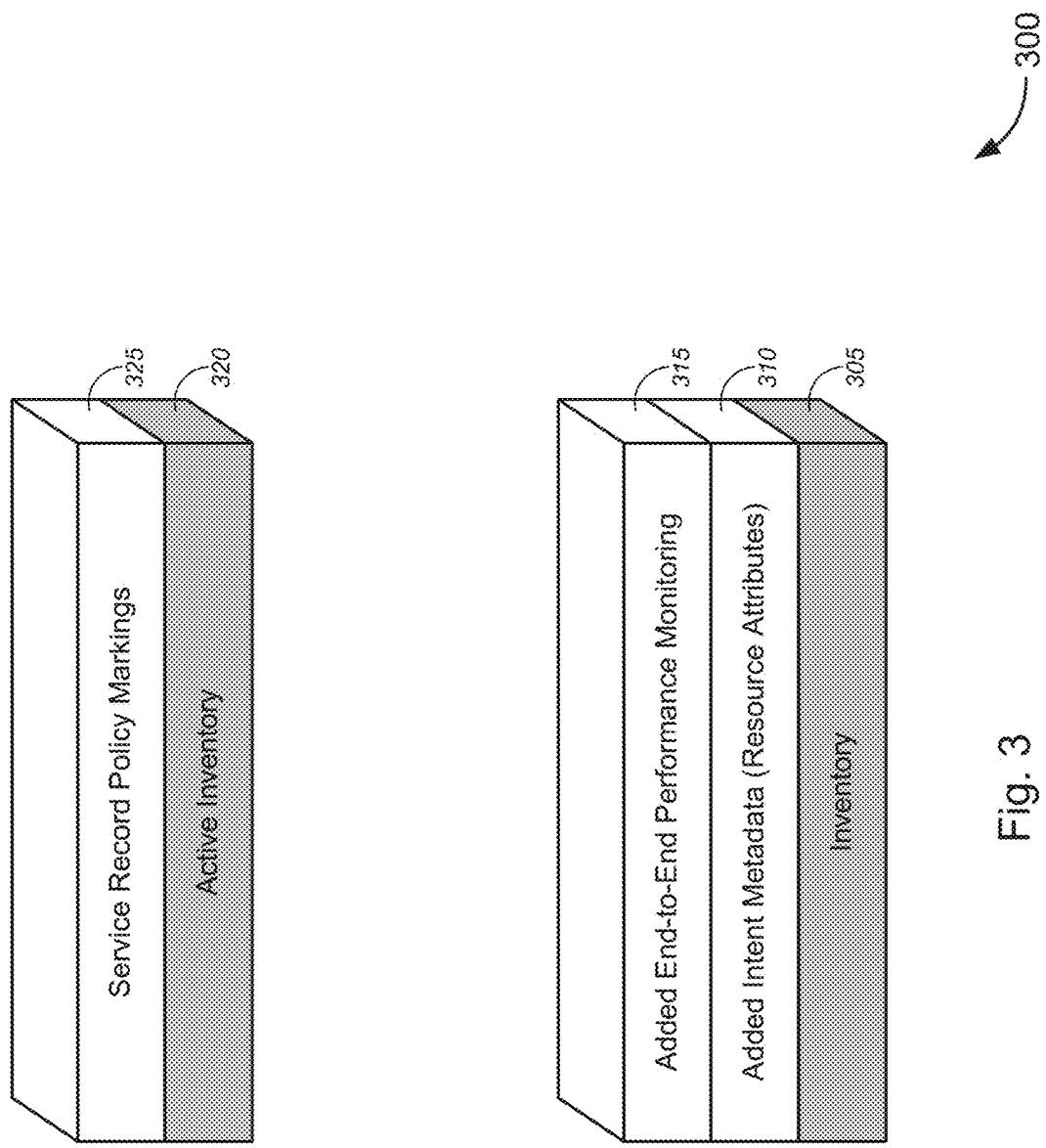
FIG. 3 is a schematic diagram illustrating a non-limiting example of types of metadata that may be added or striped in inventories of network resources, in accordance to various embodiments.

FIG. 3 is a schematic diagram illustrating a non-limiting example 300 of types of metadata that may be added or striped in inventories of network resources, in accordance to various embodiments.

In the non-limiting example 300 of FIG. 3, an inventory 305 (which might correspond to resource inventory database 145 or 215 of FIG. 1 or 2, or the like) might be striped with added intent metadata (including resource attributes or the like) 310, and in some cases, might additionally be striped with added end-to-end performance monitoring 315. In some embodiments, an active inventory 320 (which might correspond to active inventory database 155 or 235 of FIG. 1 or 2, or the like) might be striped with service record policy markings 325 (which might correspond to service record 230 of FIG. 2, or the like).

As shown in FIG. 3, end-to-end performance and resource metadata (which might include path based, point based, and/or the like) to a controller database and state machines. In effect, every controller might have a two-layer resource database. The service conformance engine might ensure that faulty equipment are removed from the inventory, and might monitor the active inventory 320 to ensure the system remains operational. The service commission engine might choose how to set up new sessions by picking from the inventory that are not actively assigned. Intent-based service assignment might require that the intent-related metadata for the equipment, and path are part of the inventory so pre-selections can be made on qualified service resources per intent request. For example, if one wants to implement delay-based intent, one might create a list of the delay between two points, and might choose the lower delay routes as viable selection candidates.

Process-wise, the "intent" translation engine might resolve a candidate list of viable resources and might remove non-compliant open inventory. A service engine might apply load balancing, prioritization, other standard service configuration and/or conformance routines, and/or the like. This may include, without limitation, pricing and/or informing a customer that his or her service level is not sufficiently high to receive that level of performance. In some cases, the selection might also be made on the customer profile, and existing service level agreements ("SLAs") of the service, etc.

Once the service is assigned, the end-to-end performance metadata and/or the active inventory record might be marked with the corresponding or appropriate intent or policy marking or restriction, and performance monitoring might be used for automated repair actions. System stability inputs might be sent to the service conformance engine to perform audits, as described above with respect to FIGS. 1 and 2.

Figure 4A:
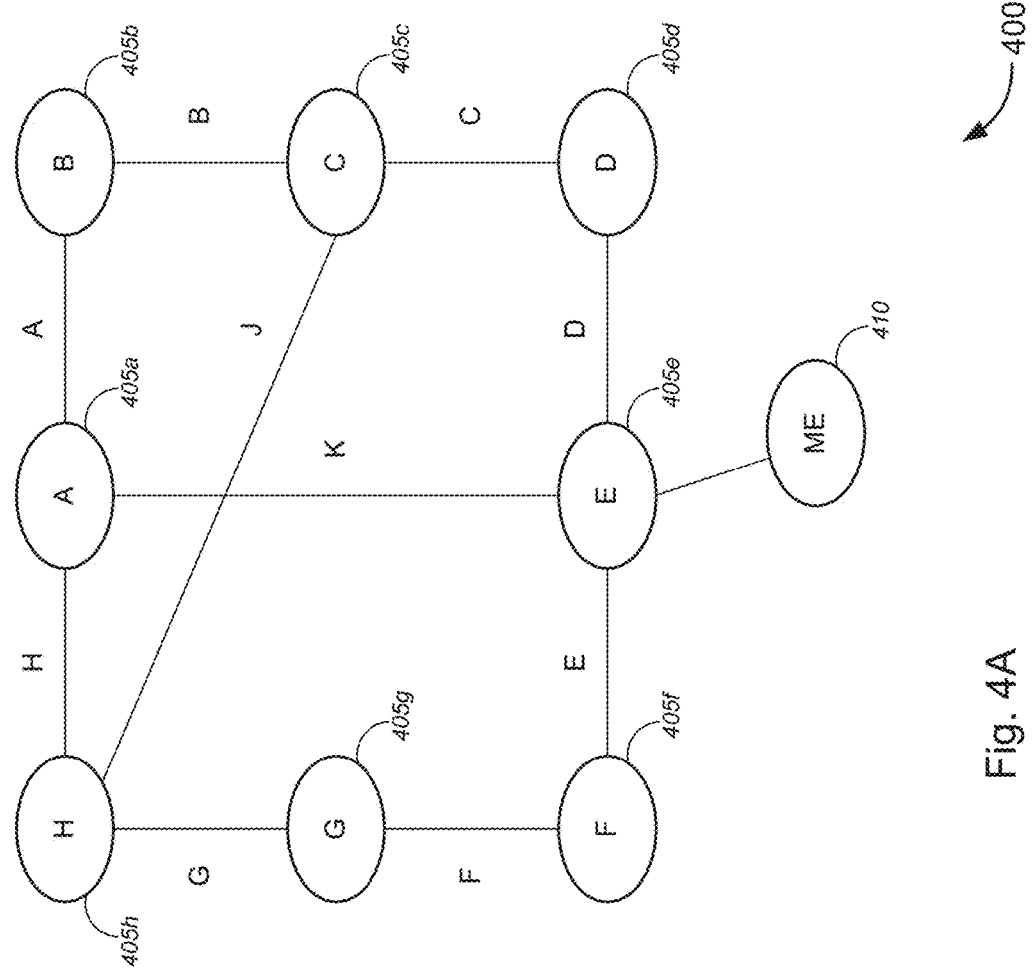
FIGS. 4A-4C are schematic diagrams illustrating various non-limiting examples of implementing intent-based service configuration, service conformance, and/or service auditing, in accordance to various embodiments.
Figure 4B:
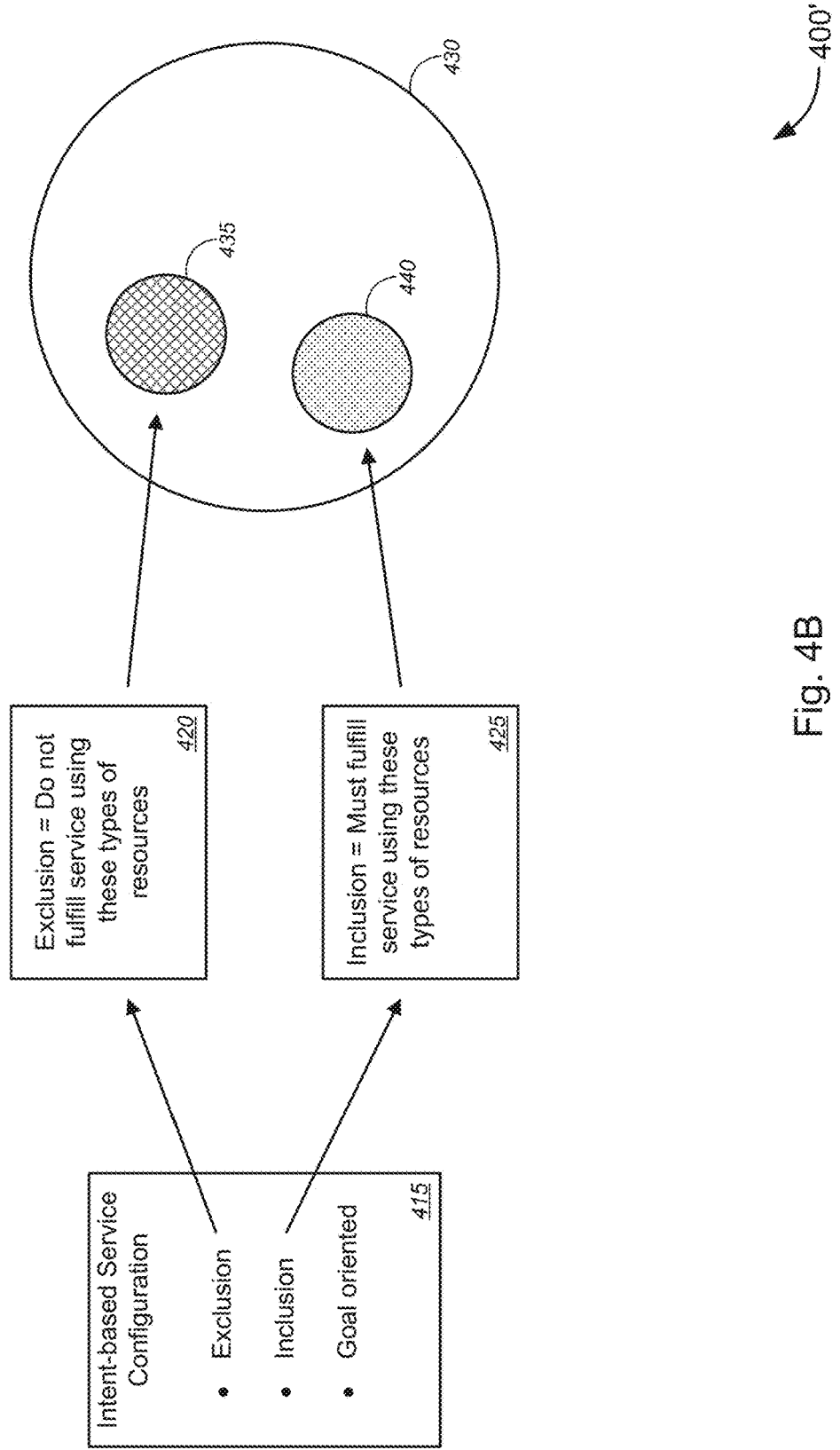
Figure 4C:
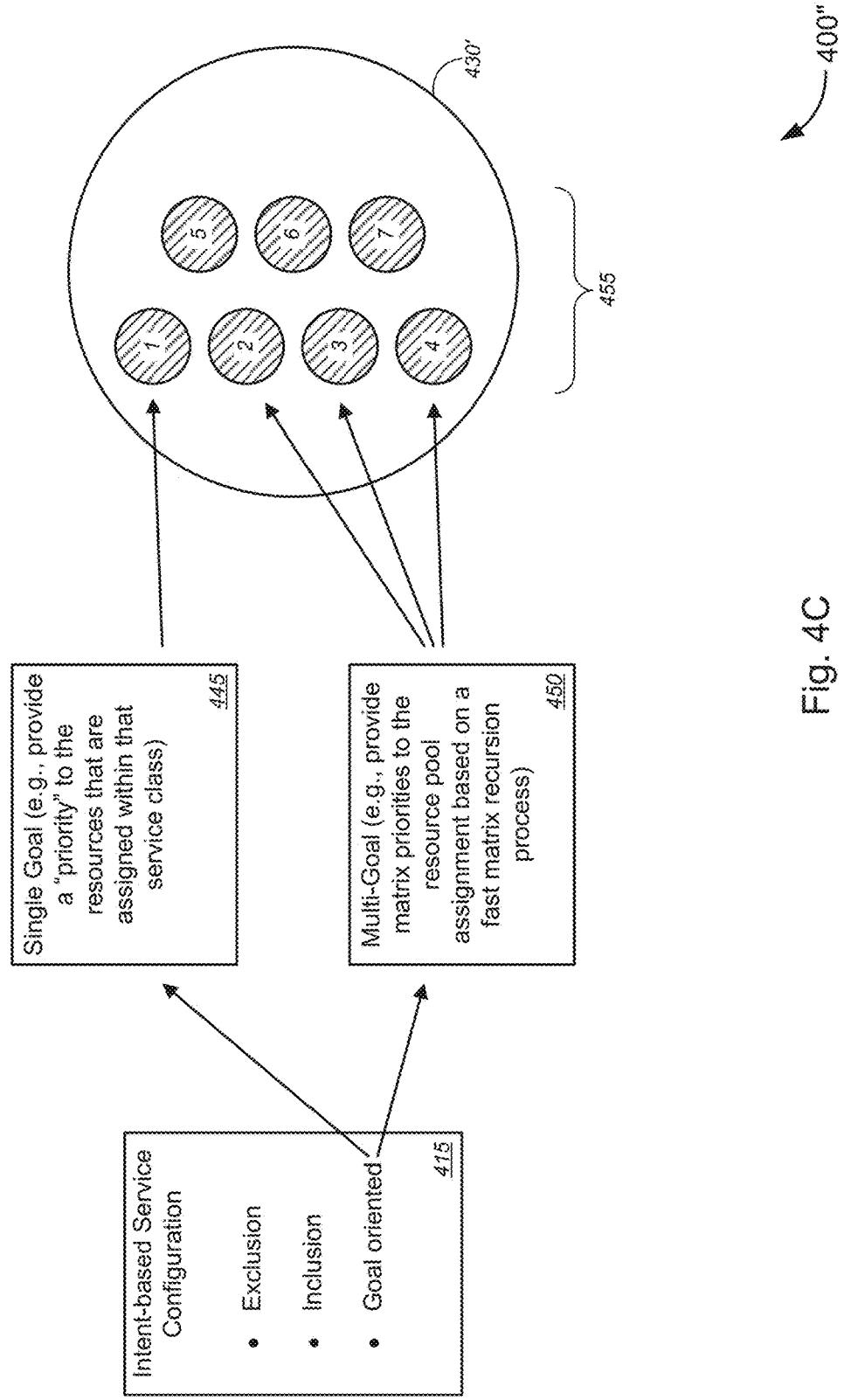

FIGS. 4A-4C (collectively, "FIG. 4") are schematic diagrams illustrating various non-limiting examples 400, 400', and 400" of implementing intent-based service configuration, service conformance, and/or service auditing, in accordance to various embodiments.

In the non-limiting example 400 of FIG. 4A, a plurality of nodes 405 might include, without limitation, node A 405a, node B 405b, node C 405c, node D 405d, node E 405e, node F 405f, node G 405g, node H 405h, and/or the like. The system might further comprise ME node 410. The system might further comprise paths A through K, with path A between node A 405a and node B 405b, path B between node B 405b and node C 405c, path C between node C 405c and node D 405d, path D between node D 405d and node E 405e, path E between node E 405e and node F 405f, path F between node F 405f and node G 405g, path G between node G 405g and node H 405h, path H between node H 405h and node A 405a, path J between node H 405h and node C 405c, path K between node A 405a and node E 405e, and/or the like. The system might further comprise a path between the ME node 410 and one of the nodes 405 (e.g., node E 405e, or the like). Here, each node 405 might be a network resource or might include a network resource(s), or the like.

Here, the intent framework might require a named goal that includes standardized criteria that may be a relationship between two items. For example, the named goal (or intent) might include, without limitation, lowest delay (where the criteria might be delay), least number of hops (where the criteria might be hops), proximity to me (in this case, the ME node 410; where the criteria might be geographical proximity, geophysical proximity, distance, etc.). In some embodiments, two or more goals (or intents) might be combined. In all cases, the criteria might be added or striped via metadata into the inventory database (e.g., databases 145, 150, 155, 170, 215, 220, and/or 235 of FIGS. 1 and 2, or the like) and might be used for node and/or resource selection or deselection. In goal-oriented implementation, prioritization striping might be applied for the fulfillment engine to be considered, possibly along with selection or deselection criteria.

In some cases, where goal-oriented intent is established, the inventory database might be augmented with tables that correlate with the "intent" criteria (such as shown in the delay table in FIG. 4A). For instance, the table might include intent (in this case, delay represented by the letter "D"), the path (e.g., path A through K, or the like), the delay (in this case, delay in milliseconds, or the like).

With reference to the non-limiting example 400' of FIG. 4B, intent-based service configuration (at block 415) might include, without limitation, exclusion intent, intrusion intent, and goal-oriented intent, or the like. In some embodiments, the exclusion intent (as indicated at block 420) might refer to intent or requirement not to fulfill network service using the indicated types of resources (in this case, resources 435 within a set of resources 430), while the inclusion intent (as indicated at block 425) might refer to intent or requirement to fulfill service using the indicated types of resources (in this case, resources 440 within the set of resources 430), or the like.

Here, the exclusion and inclusion intents might modify the pool of resources that the fulfillment process might pick from by removing (i.e., excluding) or limiting (i.e., including) the resources that can be assigned to fulfill the service. Once this process is completed, then the normal fulfillment process continues on.

Referring to the non-limiting example 400" of FIG. 4C, according to some embodiments, the goal-oriented intent might include a single goal (as indicated at block 445) or a multi-goal (as indicated at block 450). In some cases, the single goal might, for instance, provide a "priority" to the resources that are assigned within that service class. For example, the single goal might include a priority to require low delay, for instance. In some instance, the multi-goal might, for example, provide matrix priorities to the resource pool assignment based on a fast matrix recursion process, or the like. In some embodiments, with goal-oriented intent, the user might apply one or more goals to the engine that then performs a single or matrix recursion to identify the best resources to meet the intent, and either passes a candidate list to the fulfillment engineer or stripes the inventory for the specific choice being made. Subsequently, fulfillment might continue.

In some cases, the set of resources 430' (as shown in FIG. 4C) might include resources 1 through 7 455. In one example, a single goal might provide, for instance, priority to resource 1 that is assigned within that service class (as depicted by the arrow between block 445 and resource 1 in FIG. 4C), or the like. In another example, a multi-goal might provide matrix priorities to the resource pool (including, without limitation, resources 2-4, or the like) that are assigned based on a fast matrix recursion process (as depicted by the arrows between block 450 and resources 2-4 in FIG. 4C), or the like.

Figure 5A:
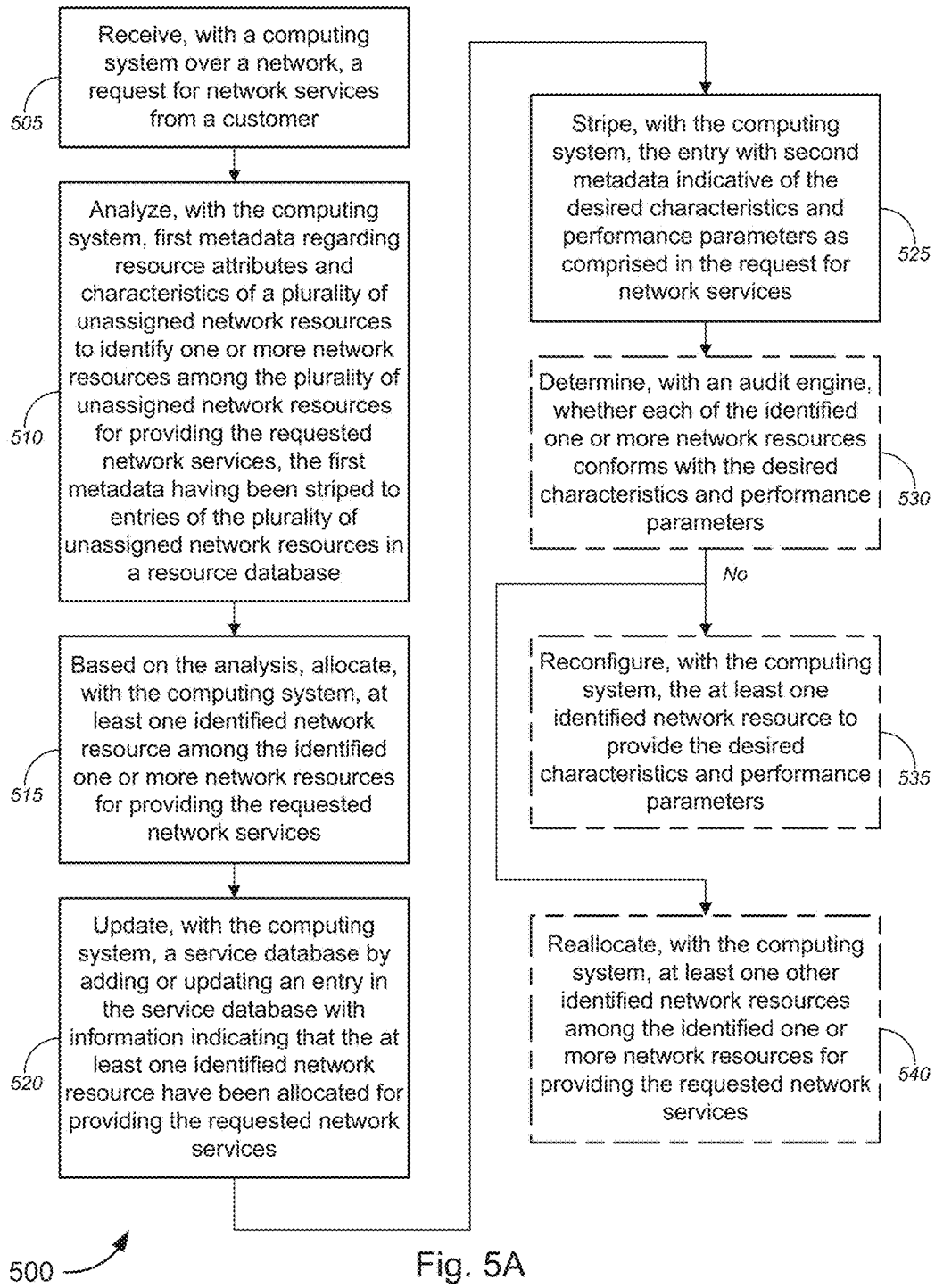
FIGS. 5A and 5B are flow diagrams illustrating another method for implementing intent-based service configuration, service conformance, and service auditing, in accordance with various embodiments.
Figure 5B:
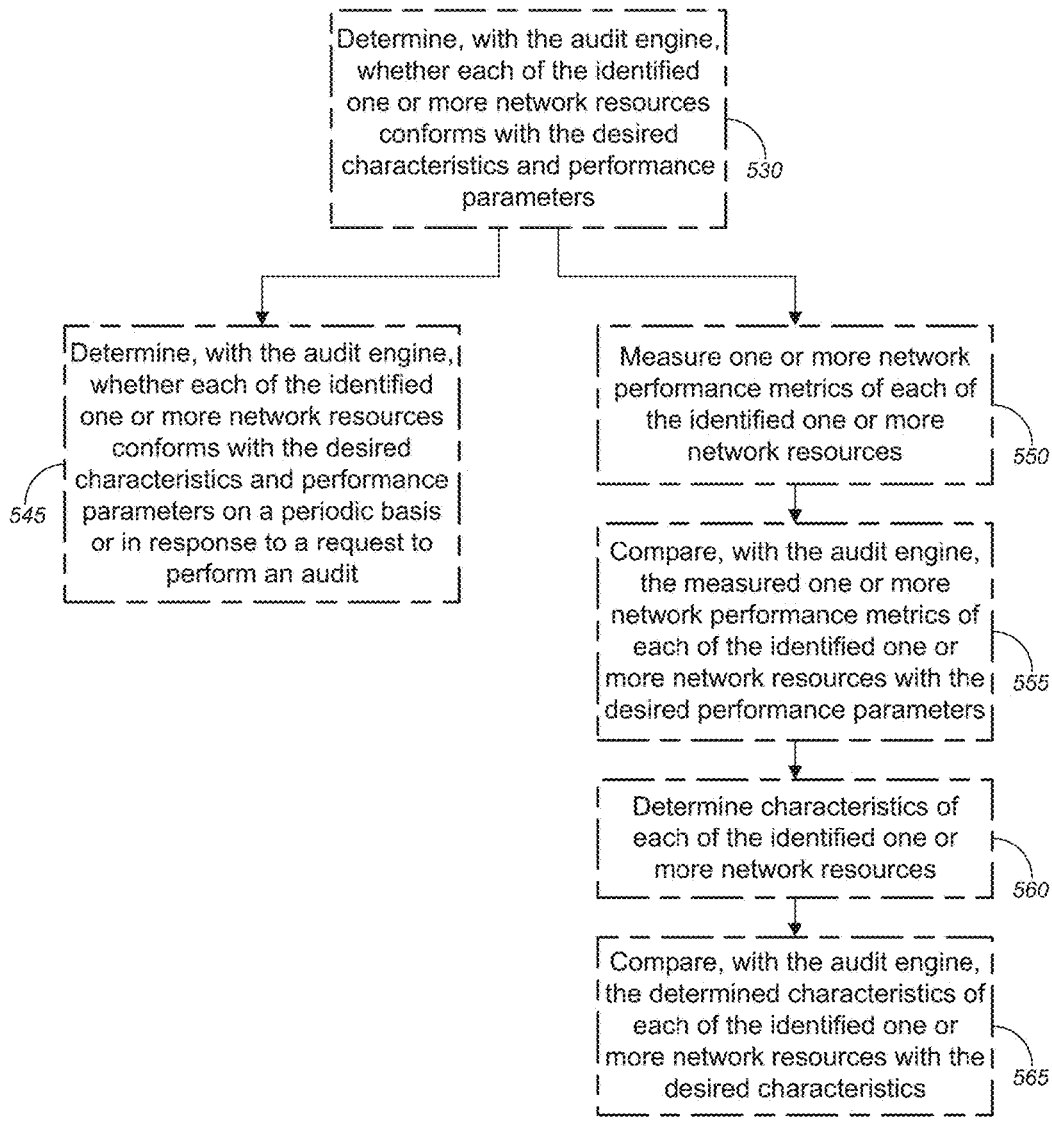

FIGS. 5A and 5B (collectively, "FIG. 5") are flow diagrams illustrating another method 500 for implementing intent-based service configuration, service conformance, and service auditing, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems, examples, or embodiments 100, 200, 200', 300, 400, 400', and 400" of FIGS. 1, 2A, 2B, 3, 4A, 4B, and 4C respectively (or components thereof), such methods may also be implemented using any suitable hardware (or software) implementation. Similarly, while each of the systems, examples, or embodiments 100, 200, 200', 300, 400, 400', and 400" of FIGS. 1, 2A, 2B, 3, 4A, 4B, and 4C, respectively (or components thereof), can operate according to the method 500 illustrated by FIG. 5 (e.g., by executing instructions embodied on a computer readable medium), the systems, examples, or embodiments 100, 200, 200', 300, 400, 400', and 400" of FIGS. 1, 2A, 2B, 3, 4A, 4B, and 4C can each also operate according to other modes of operation and/or perform other suitable procedures.

In the non-limiting embodiment of FIG. 5A, method 500, at block 505, might comprise receiving, with a computing system over a network, a request for network services from a customer. The request for network services might include desired characteristics and performance parameters for the requested network services, without information regarding any of specific hardware, specific hardware type, or specific network, and/or the like, for providing the requested network services. In some embodiments, the computing system might include, without limitation, one of a server computer over a network, a cloud-based computing system over a network, or a distributed computing system, and/or the like. In some cases, the desired performance parameters might include, but are not limited to, at least one of a maximum latency, a maximum jitter, a maximum packet loss, or a maximum number of hops, and/or the like. In some instances, the desired characteristics might include, without limitation, at least one of requirement for network equipment to be geophysically proximate to the customer, requirement for network equipment to be located within a geophysical location, requirement to avoid routing network traffic through a geophysical location, requirement to route network traffic through a geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multi-goals indicated by the customer, and/or the like.

At block 510, method 500 might comprise analyzing, with the computing system, first metadata regarding resource attributes and characteristics of a plurality of unassigned network resources to identify one or more network resources among the plurality of unassigned network resources for providing the requested network services, the first metadata having been striped to entries of the plurality of unassigned network resources in a resource database. In some cases, the first metadata might be analyzed after being received by the computing system in response to one of a pull data distribution instruction, a push data distribution instruction, or a hybrid push-pull data distribution instruction.

Method 500 might further comprise, based on the analysis, allocating, with the computing system, at least one identified network resource among the identified one or more network resources for providing the requested network services (block 515). Method 500 might further comprise, at block 520, updating, with the computing system, a service database by adding or updating an entry in the service database with information indicating that the at least one identified network resource have been allocated for providing the requested network services. At block 525, method 500 might comprise striping, with the computing system, the entry with second metadata indicative of the desired characteristics and performance parameters as comprised in the request for network services.

Method 500, at optional block 530, might comprise determining, with an audit engine, whether each of the identified one or more network resources conforms with the desired characteristics and performance parameters. Based on a determination that at least one identified network resource among the identified one or more network resources fails to conform with the desired performance parameters within first predetermined thresholds or based on a determination that the determined characteristics of the at least one identified network resource fails to conform with the desired characteristics within second predetermined thresholds, method 500 might further comprise one of: reconfiguring, with the computing system, the at least one identified network resource to provide the desired characteristics and performance parameters (optional block 535); or reallocating, with the computing system, at least one other identified network resources among the identified one or more network resources for providing the requested network services (optional block 540).

With reference to FIG. 5B, determining, with the audit engine, whether each of the identified one or more network resources conforms with the desired characteristics and performance parameters (at block 530) might comprise determining, with the audit engine, whether each of the identified one or more network resources conforms with the desired characteristics and performance parameters on a periodic basis or in response to a request to perform an audit (optional block 545). Alternatively, determining, with the audit engine, whether each of the identified one or more network resources conforms with the desired characteristics and performance parameters (at block 530) might comprise determining, with the audit engine, whether each of the identified one or more network resources conforms with the desired characteristics and performance parameters, by: measuring one or more network performance metrics of each of the identified one or more network resources (optional block 550); comparing, with the audit engine, the measured one or more network performance metrics of each of the identified one or more network resources with the desired performance parameters (optional block 555); determining characteristics of each of the identified one or more network resources (optional block 560); and comparing, with the audit engine, the determined characteristics of each of the identified one or more network resources with the desired characteristics (optional block 565).

In some embodiments, each of the one or more network performance metrics might include, without limitation, at least one of quality of service ("QoS") measurement data, platform resource data and metrics, service usage data, topology and reference data, historical network data, or network usage trend data, and/or the like. Alternatively, or additionally, each of the one or more network performance metrics might include, but are not limited to, one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like.

Exemplary System and Hardware Implementation

Figure 6:
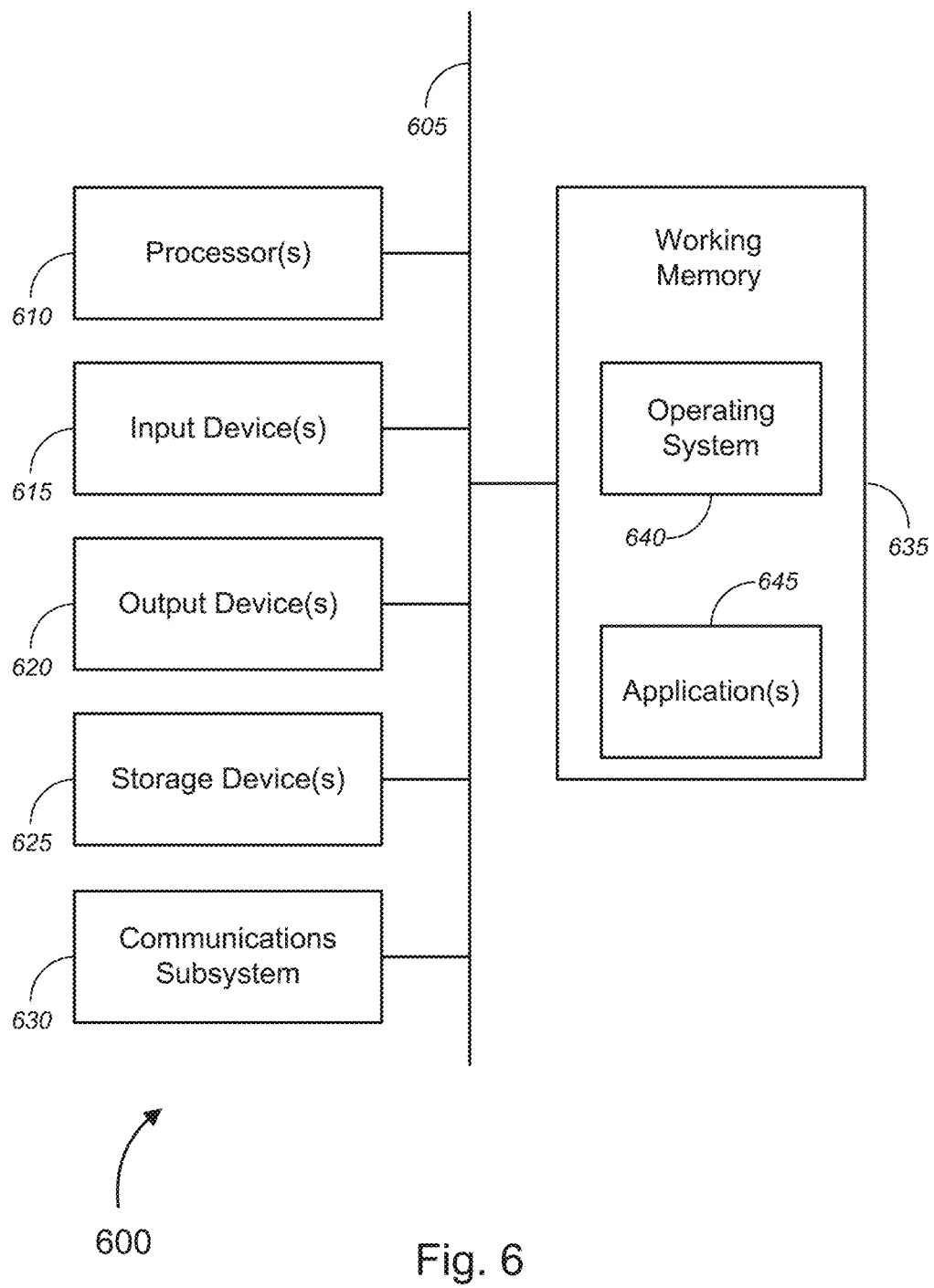
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., computing system 105, user devices 120*a*-120*n*, network resources 130, QoS test and validate server 160, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., computing system 105, user devices 120*a*-120*n*, network resources 130, QoS test and validate server 160, etc.), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire, and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
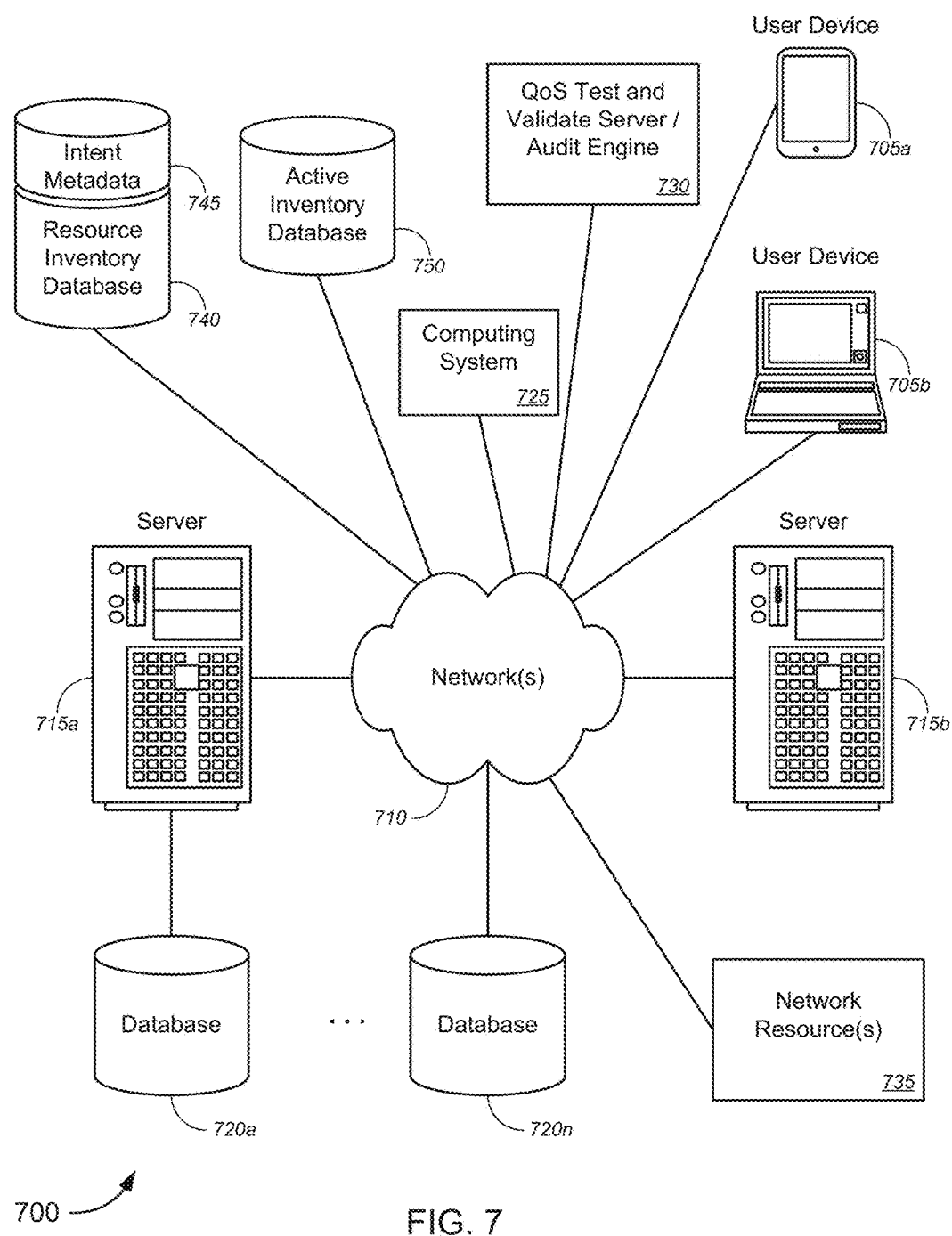
FIG. 7 is a block diagram illustrating a networked system of computers, computing systems, or system hardware architecture, which can be used in accordance with various embodiments.

As noted above, a set of embodiments comprises methods and systems for implementing network services orchestration, and, in particular embodiments, to methods, systems, and computer software for implementing intent-based service configuration, service conformance, and service auditing. FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to network(s) 110, 125, 135a-135n, and 140a-140n of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing network services orchestration, and, in particular embodiments, to methods, systems, and computer software for implementing intent-based service configuration, service conformance, and service auditing, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720n can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise computing system 725 (similar to computing systems 105 of FIG. 1, or the like), quality of service ("QoS") test and validate server or audit engine 730 (similar to QoS test and validate server or audit engine 160 of FIG. 1, or the like), one or more network resources 735 (similar to network resources 130 of FIG. 1, or the like), resource inventory database 740 (similar to resource inventory databases 145, 215, and 305 of FIGS. 1-3, or the like), intent metadata database 745 (similar to resource inventory databases 150 and 220 of FIGS. 1 and 2, or the like), and active inventory database 750 (similar to resource inventory databases 155, 235, and 320 of FIGS. 1-3, or the like).

In operation, computing system 725 might receive a request for network services from a customer (e.g., from user device 705a or 705b (which might correspond to user devices 120a-120n of FIG. 1, or the like)). The request for network services might comprise desired characteristics and performance parameters for the requested network services, without information regarding any of specific hardware, specific hardware type, or specific network for providing the requested network services.

The computing system 725 might analyze first metadata regarding resource attributes and characteristics of a plurality of unassigned network resources to identify one or more network resources among the plurality of unassigned network resources for providing the requested network services, the first metadata having been striped to entries of the plurality of unassigned network resources in a resource database (e.g., resource inventory database 740, or the like). Based on the analysis, the computing system 725 might allocate at least one identified network resource among the identified one or more network resources for providing the requested network services.

The computing system 725 might update a service database by adding or updating an entry in the service database (e.g., resource inventory database 740 or intent metadata database 745, or the like) with information indicating that the at least one identified network resource have been allocated for providing the requested network services, and might stripe the entry with second metadata (in some cases, in resource inventory database 740, intent metadata database 745, or active inventory database 750, or the like) indicative of the desired characteristics and performance parameters as comprised in the request for network services.

According to some embodiments, the desired performance parameters might include, without limitation, at least one of a maximum latency, a maximum jitter, a maximum packet loss, or a maximum number of hops, and/or the like. In some embodiments, the desired characteristics might include, but are not limited to, at least one of requirement for network equipment to be geophysically proximate to the customer, requirement for network equipment to be located within a geophysical location, requirement to avoid routing network traffic through a geophysical location, requirement to route network traffic through a geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multi-goals indicated by the customer, and/or the like.

Merely by way of example, in some cases, the audit engine 730 might determine whether each of the identified one or more network resources conforms with the desired characteristics and performance parameters. In some instances, determining whether each of the identified one or more network resources conforms with the desired characteristics and performance parameters might comprise determining, with the audit engine, whether each of the identified one or more network resources conforms with the desired characteristics and performance parameters on a periodic basis or in response to a request to perform an audit. Alternatively, determining whether each of the identified one or more network resources conforms with the desired characteristics and performance parameters might comprise determining, with the audit engine, whether each of the identified one or more network resources conforms with the desired characteristics and performance parameters, by: measuring one or more network performance metrics of each of the identified one or more network resources; comparing, with the audit engine, the measured one or more network performance metrics of each of the identified one or more network resources with the desired performance parameters; determining characteristics of each of the identified one or more network resources; and comparing, with the audit engine, the determined characteristics of each of the identified one or more network resources with the desired characteristics. Based on a determination that at least one identified network resource among the identified one or more network resources fails to conform with the desired performance parameters within first predetermined thresholds or based on a determination that the determined characteristics of the at least one identified network resource fails to conform with the desired characteristics within second predetermined thresholds, the computing system 725 might perform one of: reconfiguring the at least one identified network resource to provide the desired characteristics and performance parameters; or reallocating at least one other identified network resources among the identified one or more network resources for providing the requested network services.

These and other functions of the system 700 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with a computing system over a network, a request for network services from a customer, the request for network services comprising desired characteristics and performance parameters for the requested network services, without information regarding any of specific hardware, specific hardware type, or specific network for providing the requested network services;

analyzing, with the computing system, first metadata regarding resource attributes and characteristics of a plurality of unassigned network resources to identify one or more network resources among the plurality of unassigned network resources for providing the requested network services, the first metadata having been striped to entries of the plurality of unassigned network resources in a resource database;

based on the analysis, allocating, with the computing system, at least one identified network resource among the identified one or more network resources for providing the requested network services;

updating, with the computing system, a service database by adding or updating an entry in the service database with information indicating that the at least one identified network resource have been allocated for providing the requested network services; and striping, with the computing system, the entry with second metadata indicative of the desired characteristics and performance parameters as comprised in the request for network services.

2. The method of claim 1, further comprising:

determining, with an audit engine, whether each of the identified one or more network resources conforms with the desired characteristics and performance parameters.

3. The method of claim 2, wherein determining whether each of the identified one or more network resources conforms with the desired characteristics and performance parameters comprises determining, with the audit engine, whether each of the identified one or more network resources conforms with the desired characteristics and performance parameters on a periodic basis or in response to a request to perform an audit.

4. The method of claim 2, wherein determining whether each of the identified one or more network resources conforms with the desired characteristics and performance parameters comprises determining, with the audit engine, whether each of the identified one or more network resources conforms with the desired characteristics and performance parameters, by:

measuring one or more network performance metrics of each of the identified one or more network resources;

comparing, with the audit engine, the measured one or more network performance metrics of each of the identified one or more network resources with the desired performance parameters;

determining characteristics of each of the identified one or more network resources; and comparing, with the audit engine, the determined characteristics of each of the identified one or more network resources with the desired characteristics.

5. The method of claim 2, further comprising:

based on a determination that at least one identified network resource among the identified one or more network resources fails to conform with the desired performance parameters within first predetermined thresholds or based on a determination that the determined characteristics of the at least one identified network resource fails to conform with the desired characteristics within second predetermined thresholds, performing one of:

reconfiguring, with the computing system, the at least one identified network resource to provide the desired characteristics and performance parameters; or reallocating, with the computing system, at least one other identified network resources among the identified one or more network resources for providing the requested network services.

6. The method of claim 2, wherein each of the one or more network performance metrics comprise at least one of quality of service ("QoS") measurement data, platform resource data and metrics, service usage data, topology and reference data, historical network data, or network usage trend data.

7. The method of claim 2, wherein each of the one or more network performance metrics comprise one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS").

8. The method of claim 1, wherein the computing system comprises one of a server computer over a network, a cloud-based computing system over a network, or a distributed computing system.

9. The method of claim 1, wherein the desired performance parameters comprise at least one of a maximum latency, a maximum jitter, a maximum packet loss, or a maximum number of hops.

10. The method of claim 1, wherein the desired characteristics comprise at least one of requirement for network equipment to be geophysically proximate to the customer, requirement for network equipment to be located within a geophysical location, requirement to avoid routing network traffic through a geophysical location, requirement to route network traffic through a geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multi-goals indicated by the customer.

11. The method of claim 1, wherein the first metadata is analyzed after being received by the computing system in response to one of a pull data distribution instruction, a push data distribution instruction, or a hybrid push-pull data distribution instruction.

12. An apparatus, comprising:

at least one processor; and a non-transitory computer readable medium communicatively coupled to the at least one processor, the non-transitory computer readable medium having stored thereon computer software comprising a set of instructions that, when executed by the at least one processor, causes the apparatus to:

receive, over a network, a request for network services from a customer, the request for network services comprising desired characteristics and performance parameters for the requested network services, without information regarding any of specific hardware, specific hardware type, or specific network for providing the requested network services;

analyze first metadata regarding resource attributes and characteristics of a plurality of unassigned network resources to identify one or more network resources among the plurality of unassigned network resources for providing the requested network services, the first metadata having been striped to entries of the plurality of unassigned network resources in a resource database;

based on the analysis, allocate at least one identified network resource among the identified one or more network resources for providing the requested network services;

update a service database by adding or updating an entry in the service database with information indicating that the at least one identified network resource have been allocated for providing the requested network services; and stripe the entry with second metadata indicative of the desired characteristics and performance parameters as comprised in the request for network services.

13. The apparatus of claim 12, further comprising:
an audit engine, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the audit engine to:
determine whether each of the identified one or more network resources conforms with the desired characteristics and performance parameters.

14. The apparatus of claim 13, wherein determining whether each of the identified one or more network resources conforms with the desired characteristics and performance parameters comprises determining, with the audit engine, whether each of the identified one or more network resources conforms with the desired characteristics and performance parameters on a periodic basis or in response to a request to perform an audit.

15. The apparatus of claim 13, wherein determining whether each of the identified one or more network resources conforms with the desired characteristics and performance parameters comprises determining whether each of the identified one or more network resources conforms with the desired characteristics and performance parameters, by:
measuring one or more network performance metrics of each of the identified one or more network resources;
comparing the measured one or more network performance metrics of each of the identified one or more network resources with the desired performance parameters;
determining characteristics of each of the identified one or more network resources; and
comparing the determined characteristics of each of the identified one or more network resources with the desired characteristics.

16. The apparatus of claim 12, wherein the apparatus comprises one of a server computer over a network, a cloud-based computing system over a network, or a distributed computing system.

17. The apparatus of claim 12, wherein the desired performance parameters comprise at least one of a maximum latency, a maximum jitter, a maximum packet loss, or a maximum number of hops.

18. The apparatus of claim 12, wherein the desired characteristics comprise at least one of requirement for network equipment to be geophysically proximate to the customer, requirement for network equipment to be located within a geophysical location, requirement to avoid routing network traffic through a geophysical location, requirement to route network traffic through a geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multi-goals indicated by the customer.

19. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive, over a network, a request for network services from a customer, the request for network services comprising desired characteristics and performance parameters for the requested network services, without information regarding any of specific hardware, specific hardware type, or specific network for providing the requested network services;
analyze first metadata regarding resource attributes and characteristics of a plurality of unassigned network resources to identify one or more network resources among the plurality of unassigned network resources for providing the requested network services, the first metadata having been striped to entries of the plurality of unassigned network resources in a resource database;
based on the analysis, allocate at least one identified network resource among the identified one or more network resources for providing the requested network services;
update a service database by adding or updating an entry in the service database with information indicating that the at least one identified network resource have been allocated for providing the requested network services; and
stripe the entry with second metadata indicative of the desired characteristics and performance parameters as comprised in the request for network services.

20. The system of claim 19, wherein the computing system comprises one of a server computer over a network, a cloud-based computing system over a network, or a distributed computing system.

* * * * *